US012570013B2

(12) United States Patent (10) Patent No.: US 12,570,013 B2
Gebauer et al. (45) Date of Patent: Mar. 10, 2026

(54) METHOD AND CONTACTLESS DISTANCE SENSOR FOR SAFEGUARDING A MACHINE

(71) Applicant: SICK AG, Waldkirch (DE)

(72) Inventors: Jens Gebauer, Waldkirch (DE); Christoph Hofmann, Waldkirch (DE)

(73) Assignee: SICK AG, Waldkirch (DE)

( * ) Notice: Subject to any disclaimer, the term of this patent is extended or adjusted under 35 U.S.C. 154(b) by 113 days.

(21) Appl. No.: 18/434,424

(22) Filed: Feb. 6, 2024

(65) Prior Publication Data
US 2024/0261987 A1 Aug. 8, 2024

(30) Foreign Application Priority Data
Feb. 7, 2023 (DE) .......................... 102023102951.7

(51) Int. Cl.
*G06F 17/00* (2019.01)
*B25J 19/02* (2006.01)
*B25J 19/06* (2006.01)

(52) U.S. Cl.
CPC ............. *B25J 19/066* (2013.01); *B25J 19/02* (2013.01)

(58) Field of Classification Search
CPC ........ B25J 19/066; B25J 19/02; B25J 9/1676; B25J 9/1694; G05B 2219/31005; G05B 2219/37425; G05B 2219/40317; G05B 19/41895; F16P 3/144; G01S 17/04
USPC ....................................................... 700/245
See application file for complete search history.

(56) References Cited

U.S. PATENT DOCUMENTS

| | | | | |
|---|---|---|---|---|
| 6,317,953 | B1 * | 11/2001 | Pryor ...................... | B23P 19/10 |
| | | | | 29/721 |
| 8,933,593 | B2 * | 1/2015 | Haberer ................... | F16P 3/14 |
| | | | | 307/326 |
| 11,465,283 | B2 * | 10/2022 | Prinz ...................... | B25J 9/1666 |
| 11,558,729 | B2 * | 1/2023 | Hammes ................. | G01S 13/74 |
| 12,260,252 | B2 * | 3/2025 | Hofmann ................ | F16P 3/148 |
| 12,315,384 | B2 * | 5/2025 | Hofmann ................ | G06F 3/011 |

(Continued)

FOREIGN PATENT DOCUMENTS

| | | | | | |
|---|---|---|---|---|---|
| DE | | 10324628 | A1 * | 12/2004 | ......... G05B 19/4061 |
| DE | | 10360174 | B4 * | 3/2007 | ............. G01S 17/89 |

(Continued)

OTHER PUBLICATIONS

A Review of Sensing Technologies for Indoor Autonomous Mobile Robots (Year: 2024).*

*Primary Examiner* — Ronnie M Mancho
(74) *Attorney, Agent, or Firm* — Nath, Goldberg & Meyer; Jerald L. Meyer

(57) ABSTRACT
A method of safeguarding a machine is provided in which objects are recognized in a work zone of the machine in which a contactless distance sensor that is moved along measures an actual measured value for a distance with at least one distance measurement beam, a first virtual distance measurement beam that simulates the distance measurement beam is formed, and the actual measured value is compared with its first virtual measured value. In this respect, at least one further virtual distance measurement beam having an offset from the first virtual distance measurement beam is formed and a further virtual measured value is calculated with it and a comparison is made whether the actual measured value is compatible with the virtual measured values.

25 Claims, 4 Drawing Sheets

(56) References Cited

U.S. PATENT DOCUMENTS

Figure 1:
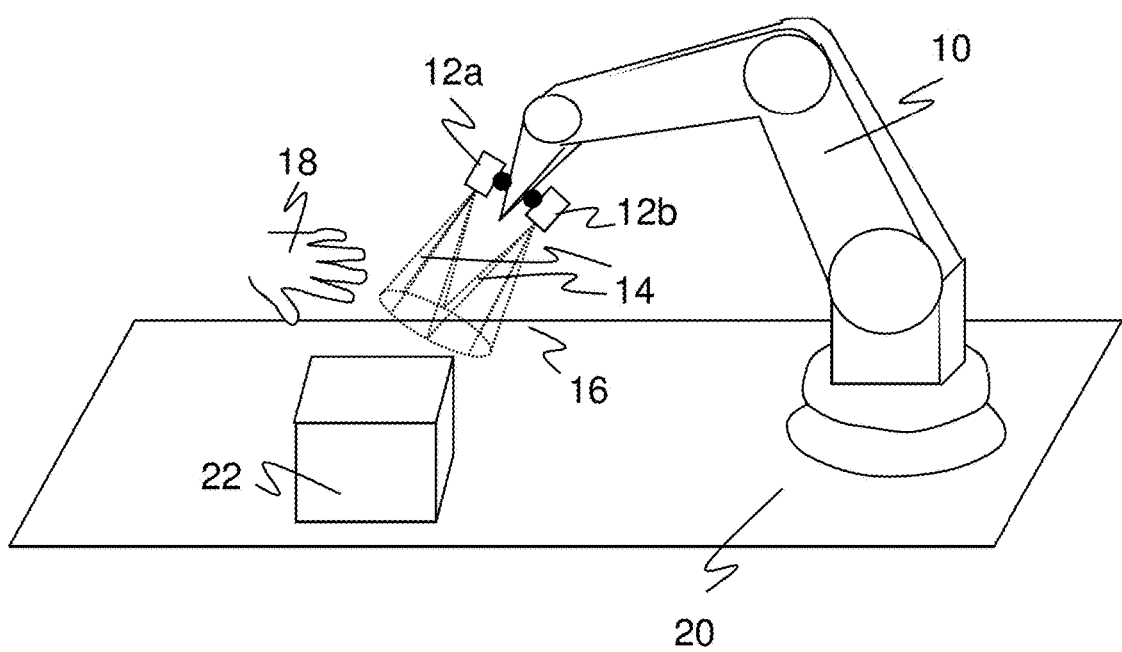

| | | | | |
|---|---|---|---|---|
| 2017/0030708 A1 * | 2/2017 | Albert | ...................... | G01S 17/48 |
| 2021/0227372 A1 * | 7/2021 | Hammes | ................... | G01S 7/41 |
| 2022/0244995 A1 * | 8/2022 | Hofmann | ................ | F16P 3/141 |
| 2023/0169684 A1 * | 6/2023 | Steinkemper | ........... | G06T 7/246 |
| | | | | 345/632 |
| 2023/0230500 A1 * | 7/2023 | Hofmann | ................ | G06F 3/011 |
| 2024/0261987 A1 * | 8/2024 | Gebauer | ................ | B25J 9/1676 |
| 2024/0316778 A1 * | 9/2024 | Hammes | ............... | B25J 19/022 |
| 2024/0326250 A1 * | 10/2024 | Hofmann | ............... | B25J 9/1666 |

FOREIGN PATENT DOCUMENTS

| | | | | | |
|---|---|---|---|---|---|
| DE | 102008063081 B4 * | 10/2014 | ............ | B25J 13/086 |
| DE | 102013020596 A1 * | 6/2015 | ............ | B25J 19/026 |
| DE | 102015112656 A1 | 2/2017 | | |
| DE | 102018118265 A1 | 1/2020 | | |
| DE | 102021119372 A1 | 2/2023 | | |
| EP | 3112900 A1 | 1/2017 | | |
| EP | 3988256 A1 | 4/2022 | | |

* cited by examiner

METHOD AND CONTACTLESS DISTANCE SENSOR FOR SAFEGUARDING A MACHINE

The invention relates to a method and to a contactless distance sensor for safeguarding a machine respectively.

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable safeguarding measure is taken. Sensors used in safety technology have to work particularly reliably and must therefore satisfy high safety demands, for example the EN13849 standard for safety of machinery and the machinery standard IEC61496 or EN61496 for electrosensitive protective equipment (ESPE). To satisfy these safety standards, a series of measures have to be taken such as a safe electronic evaluation by redundant, diverse electronics, functional monitoring, or monitoring of the contamination of optical components.

There is an increasing desire for closer cooperation with persons (HRC, human-robot collaboration) in the safety-engineering monitoring of robots, especially lightweight construction robots, also in complex environments. Relevant standards in this connection are, for example, ISO 10218 for industrial robots or ISO 15066 for collaborative robots. Similar problems result for other machines than robots, for example AGVs/AGCs (automated guided vehicles/containers).

With robots, a conventional approach limits the force such that a collision also cannot result in serious injury. In addition, edge-free round, or soft outer contours are deliberately watched out for in the design of the mechanical robot components. In this respect, however, hazard sources remain at the tool itself that can have sharp, rotating or hot parts. In addition, the mechanical measures and force limitations do not prevent any crushing, for instance of the hand between the tool and a holder or the like on a work surface.

There is here generally the possibility of co-moving a small, light distance sensor or a multiple arrangement of such distance sensors with the tool at the robot arm. DE 10 2015 112 656 A1 deals with a corresponding distance sensor. A kind of virtual protective cover or virtual protective jacket is thus spanned around the tool and the robot is braked or stopped on an intrusion of a safety related object. The distance sensor is at least safely designed in combination with the superior controller, and tests in the form of a reference movement with known reference targets are required to achieve a higher safety level. An approach to surfaces has to be taught separately for every position so that the protective cover is not triggered by the surface.

Trajectories close to the surface as for manufacturing a glue bead or a welding line can thus not be implemented. The conventional approach is also not suitable for a dynamic movement behavior in this form; for example, the unpredictable trajectory on an evasion movement or a trajectory as a response to the pose recognition of a workpiece to be gripped.

EP 3 988 256 A1 provides a more flexible protective cover by adaptation of distance thresholds that equally specify the length of the measurement beams. A respective available maximum distance up to the next background object enters into this adaptation. The maximum distance is calculated from the expected extent of the sight beam of the safeguarding sensor and from the topography of the environment. In this respect, however, problems result when the assumed sight beam differs from the actual sight beam or the assumed topography differs from the actual environment. This is particularly critical with edge hits where even slight differences can result in completely different distances.

DE 10 2018 118 265 A1 discloses a method and a monitoring system for safeguarding a machine in which the environment of a robot is detected by a distance measuring sensor and a reference edge is acquired therefrom in a teaching phase. In an operating phase, the environment detected by the sensor is compared with the reference map and a decision whether a safety related response has to be initiated is taken by a safety evaluation of differences. The evaluation of the difference takes place by a correlation measure between the desired view and the detection and is in this general aspect not suitable for a safeguarding of the above-described kind that is based on certain distance measurement beams.

The still unpublished European patent application bearing the reference number 22 127 791.2 discloses a method of validating a pose of a robot and/or sensor data of a sensor moved along with the robot. In this respect, the robot movements are compared with those of a robot model or the sensor data are compared with those of a sensor model that interacts with an environmental model. As already discussed with reference to EP 3 988 256 A1, even slight differences between the model and reality, particularly at edges, are sufficient for large differences of the predicted and actual distances. False positive object recognitions result therefrom that produce a substantial restriction of availability. In other words, productivity losses occur due to safety measures that were taken for an incorrectly assumed safety related object due to inexact model predictions.

It is therefore the object of the invention to enable a more exact object recognition.

This object is satisfied by a method and by a contactless distance for safeguarding a machine in accordance with the respective independent claim. The machine is in particular a robot or a robot arm having a tool that primarily has to be safeguarded (EOAS, end of arm safeguarding). This application example of a robot is used as representative in a number of cases in the following; the explanations are in each case to be transferred analogously to a different moving machine such as a vehicle or an AGV (automated guided vehicle). The safeguarding is based on an object recognition in a work zone of the machine. The work zone itself is known in the form of an environmental model or surface model that can also be called a topography or 3D contour of the work zone. The object recognition does not react to those objects that are unexpected, accordingly do not belong to the work zone, and are not represented in the surface model and it here above all targets persons or body parts to avoid accidents with injuries.

At least one contactless distance sensor is moved together with the machine, is preferably attached thereto, and determines an actual measured value for a distance with at least one distance measurement beam. Depending on whether an object to be recognized is in the distance measuring beam, this is the distance from the work zone or the object.

A first virtual distance measurement beam that corresponds to the distance measurement beam or models or simulates it is determined from a pose of the distance sensor. The term pose designates the position and/or orientation in up to six degrees of freedom. The pose of the distance sensor results from the pose of the machine and a possible offset of the distance sensor with respect to the machine that can be determined in advance and can thus be corrected. The pose of the machine can in particular be determined from a forward kinematics of the machine. Forward kinematics is a term from robotics that can, however, be transferred to other machines. It means the determination of the pose of an end effector, optionally also of further kinematic parameters such as the speed and acceleration, from information on the moving elements; with a robot arm of the joints, of, for example, rotary encoders attached there. With a robot, the forward kinematics are as a rule anyway determined for its work procedure. This information can be used to derive the pose of the distance sensor. It is clear with the pose of the distance sensor as part of the precision of the pose determination where its distance measurement beam extends so that it can be simulated by the first virtual distance measurement beam.

A first virtual measured value for the distance is calculated from the site of incidence of the first virtual distance measurement beam on the surface model of the work zone. This is a prediction for the actual measured value from the first virtual distance measurement bean and from the surface model that together simulate the measurement behavior of the distance sensor in the current situation provided that there is no object in the distance measurement beam. The actual measured value is accordingly compared with the first virtual measured value for the object recognition. Conventionally, a difference outside a tolerance would already mean that an object has been recognized. The invention selects an expanded approach that will be explained immediately and in which said comparison does not make the sole decision.

The invention starts from the basic idea of forming at least one further virtual distance measurement beam and of including it in the comparison. The at least one further virtual distance measurement beam is offset with respect to the first virtual distance measurement beam. The site of incidence on the surface model is thus determined in a very analog manner and a further virtual distance measurement value is calculated therefrom. The offset illustratively corresponds to a possible difference in the predicted pose of the distance sensor from the actual pose and/or in the surface model from the actual work zone. The further virtual measured value is thus a further conceivable prediction for the actual measured value. A comparison is now made whether the actual measured value is compatible with the virtual measured value, i.e. with the first virtual measured value and the further virtual measured value or the further virtual measured values. Compatible in particular means that the actual measured value coincides with at least one of the virtual measured values, with a tolerance, for example in the form of a threshold, an absolute or relative position error, being able to be permitted instead of a theoretical identity. If the actual measured value is incompatible with the virtual measured values, a conclusion is drawn on an object in the distance measurement beam. The actual measured value then does not match the surface model and can thus not be explained by the known contour or by the objects known to be present in the work zone.

It is a computer implemented process that runs, for example, on the distance sensor or on a safety controller or on another processing unit that is connected to the at least one distance sensor and to the machine. An implementation on the machine controller or a distributed implementation is also conceivable. It must furthermore be noted that the formation of virtual distance measurement beams only represents an illustration of the corresponding calculations and it is not necessary that a beam is specifically represented in the implementation. In a number of cases, a very much more simple calculation can take place whose result corresponds to the determination of the site of incidence of virtual distance measurement beams.

The invention has the advantage that a particularly robust method of object recognition is achieved. Additional information on the actual measured values to be expected is acquired by including the at least one further virtual distance measurement beam. This permits a considerably improved judgment whether there is actually an object in the distance measurement beam. Error recognitions through virtual measured values, in particular at edges of the surface model, are thereby intercepted. The invention facilitates the possibilities discussed above for the safeguarding of movements close to a work surface or of dynamic movements or makes them accessible to practice at all.

A check is preferably made for a recognized object whether its presence is permitted and if not, the machine is switched to a risk-reducing or safe state. A recognized object does not yet necessarily mean that a safeguarding of the machine is required. Depending on the safety concept, an object can be tolerated for brief periods, it can be ignored as too small an interfering object, it can be located sufficiently remote from the actual hazard, and is in particular outside protected fields, and the like. If, however, a recognized object does not fall under any of these defined permitted conditions, a signal triggered that switches the machine into a safe state. Risk reducing means that at least serious consequences of an accident are avoided, with accidents due to a sate state being precluded as part of the safety level reached. Depending on the application and the situation, this can be achieved by measures such as slower movements, a restricted work zone, or, where necessary, a stopping of the machine.

The surface model is preferably configured or imported, in particular as a CAD model, or the surface model is measured by a sensor. A measurement of the topography is not absolutely necessary; a 3D model can also be the basis for the detection, for instance a CAD model that is often anyway available for a number of machines and also in the case of a robot cell. If a measurement is made, a detection without disruptive machine movements is advantageous. In principle, the distance sensor itself can be used for the measurement. A special topography sensor, for example a laser scanner or a camera, in particular a 3D camera, is equally conceivable. The topography sensor can also be a very expensive or complex sensor and only operable with technical knowledge since it is only briefly required. The topography sensor can be moved along with the machine or can be attached in an external perspective. A configuration, import, or measurement of the surface model preferably takes place in advance. Alternatively or additionally, the surface model can be at least partially subsequently loaded in an operating pause or even dynamically in operation. This is sensible, for example, when one tray is replaced with another because a change to a different part to be produced is made. The subsequent loading of the corresponding surface model can be triggered automatically or manually with this production switch. A surface model of a modular design facilitates such changes; only the changed modules or portions then have to be dynamically replaced. The possibility is furthermore advantageous in the case of a manual change to a CAD model of adapting the surface model used after conclusion of the manual change by a simple command such as a mouse click.

A plurality of further virtual distance measurement beams preferably surround the first virtual distance measurement beam. A whole range of possible differences between the first virtual distance measurement beam and the real distance measurement beam of the distance sensor are thereby covered. The object recognition becomes particularly robust.

The starting points of the further virtual distance measurement beams preferably form a circular line at least topologically. The further virtual distance measurement beams thus cover differences in all conceivable directions. The further virtual distance measurement beams effectively form a kind of jacket surface that starts from the circular line of its starting points or of its respective origin. The first virtual distance measurement beam is embedded in this jacket. An at least topological circular line can still be deformed and thus, for example, be elliptically or otherwise distorted, including the possibility of corners as with a square. However, a circle in the geometrical sense and not only the topological sense is particularly preferred since it is simplest to handle and best represents the environment in so doing.

The surface model is preferably a polygon mesh, in particular a triangle mesh. The contour of the working environment can be quantized in a suitable data structure with any desired precision by a polygon mesh. The polygon mesh is assembled from polygon surface elements that will be called polygons for short in the following.

The further virtual distance measurement beams are incident on polygons that are preferably adjacent to one another without gaps. The polygons on which virtual distance measurement beams are incident are contiguous in other words. This is actually a statement on the density of the further virtual distance measurement beams that should provide a gap-free object recognition within the framework of the precision of the polygon mesh. The density condition can be calibrated at the largest distance conceivable in the surface model since the polygons on which the further virtual distance measurement beams are incident are then all the more adjacent in a gap-free manner for smaller distances. The condition of gap-free adjacent polygons does not have to apply universally, but can rather be limited, for example, to surfaces at a limited angle of incidence to the sensor. On a glancing incidence of the distance measurement beams at a very shallow angle, for example, a density of distance measurement beams infinite at times would have to be produced; such cases are of no practical interest. Each of the gap-free adjacent polygons are particularly preferably hit exactly once, at least at the greatest conceivable distance. Multiple hits by a plurality of the further virtual distance measurement beams are harmless for safety, but unnecessarily take up processing time without any new information. In an embodiment in which the starting points of the further virtual distance measurement beams form a circular line, the density condition can be formulated over the angular distance or peripheral distance of the further virtual distance measurement beams that has to be selected as correspondingly small. The gap-free adjacent polygons then form an arc within the framework of their discrete resolution that can be perspectively distorted to form an elliptical arc and can be divided by edges in the working environment.

Virtual measured values for the distance are preferably determined for polygons that are enclosed by polygons on which further virtual distance measurement beams are incident. That portion of the surface model that is taken into account by the further virtual distance measurement beams is thus effectively inwardly completed or terminated. In an embodiment in which the starting points of the further virtual distance measurement beams at least topologically form a circular line, the total circular area and no longer only the circular line or the periphery is thus taken into account. As already mentioned above, the incidence of virtual distance measurement beams is primarily an illustration that thus does not have to correspond to the implementation.

Enclosed polygons or associated virtual measured values can be simply determined with substantially less effort via the calculation of a distance of two points in space.

The starting points of the further virtual distance measurement beams preferably form a grating. This is an alternative possibility of taking account of a planar neighborhood of the surface model instead of only a line, in particular of a surrounding line in the form of an at least topological circular line. In a number of implementations, it will be less laborious to select the embodiment presented in the previous paragraph that manages with fewer further virtual distance measurement beams with the same considered area. The above-named density condition preferably has to be applied to the mutual distances of the starting points so that all the polygons in the region of the grating are hit gap-free by at least one further virtual distance measurement beam. The grating is preferably regular since it is difficult to generally satisfy the density condition with irregular distances conceivable per se. It must again be mentioned that it is not necessary to form a grating of virtual distance measurement beams in the implementation in the sense of a direct representation; any in part considerably simpler calculations are sufficient to acquire the corresponding virtual measured values.

The further virtual distance measurement beams preferably extend in parallel with the first virtual distance measurement beam. The further virtual distance measurement beams thus also preferably extend in parallel with one another. In an embodiment in which the starting points of the further virtual distance measurement beams are disposed at least topologically on a circular line, the further virtual distance measurement beams correspondingly form a cylinder jacket. In principle, obliquely extending further virtual distance measurement beams are conceivable, in particular having a conical jacket instead of a cylinder jacket; but avoidable distance dependencies are thereby introduced. As a rule, it is not of any use in safety engineering if only larger objects are reliably recognized at a greater distance; a detection capability for the whole work zone is conversely rather defined. An acute angle in which therefore the distance measurement beams converge toward one another can still be sensible in some embodiments.

The actual measured value and the virtual measured values are preferably determined and compared again cyclically. An update of the virtual measured values thus takes place at measurement cycles, preferably for the highest time resolutions at every measurement cycle. A detection cycle of object recognition then results from this.

An actual measured value that is larger than all the virtual measured values is preferably evaluated as compatible and no object is thus recognized in the distance measurement beam for this case. In this situation, the actual measured value does not match any virtual measured value within the tolerances. It is, however, an object further remote than the work zone and this is harmless from a technical safety aspect. Such a dealing with too large an actual measured value allows the surface model to be simplified and to leave out bumps, for example, i.e. outwardly arched partial contours of the working environment from the viewpoint of the distance sensor, and to replace them with a planar surface. Alternatively, in accordance with the closed circuit principle, a measured value is always required that confirms the model, that is also does not tolerate too large an actual measured value.

The distance sensor preferably has a plurality of distance measurement beams with which a respective actual measured value for the distance is determined and is compared with virtual measured values from virtual distance measurement beams for a respective distance measurement beam. In this embodiment, there are a plurality of real measurements, with the corresponding distance measurement beams emanating from the same distance sensor, a respective one distance measurement beam emanating from one of a plurality of distance sensors, or one-beam and multi-beam distance sensors being used in a mixed form. The above process is carried out for each of these distance measurement beams, i.e. the respective distance measurement beam is simulated by a virtual distance measurement beam and at least one further virtual distance measurement beam offset therefrom is formed to recognize an object in the observed distance measurement beam by a comparison of the actual measured value of the observed distance measurement beam with the virtual measured values of the associated virtual distance measurement beams.

The distance measurement beams preferably form a protective cover, with no object being recognized in the distance measurement beam when the actual measured value exceeds a length of the protective cover. The protective cover is in particular disposed around the tool tip at a robot arm so that approaches to the tool tip are recognized in good time. The protective cover does not necessarily have to be fully closed, for instance if no access is possible from the rear for mechanical or other reasons. Objects at a distance greater than the length of the protective cover are not relevant from a technical safety aspect and are therefore ignored in the object recognition in this embodiment. On an approach to the work zone, the protective cover can be adapted to the surface module since access in regions of the protective cover thereby shortened is not possible, but is rather blocked by sections of the work zone. Care must particularly be taken in this embodiment not to confuse the distance measurement beams and the virtual distance measurement beams. The distance measurement beams themselves already form a cylinder jacket or conical jacket. A separate virtual cylinder jacket or conical jacket of the further virtual distance measurement beams is formed around every distance measurement beam, in the preferred embodiment with starting points of further virtual distance measurement beams on a circular line.

The distance measurement beam preferably performs a scan movement. This is an alternative to using a plurality of distance measurement beams to achieve a larger zone of object recognition. The two can be combined with one another as in the case of a multi-beam laser scanner. The virtual distance measurement beams are formed for the respective scan position of the distance measurement beam.

The contactless distance sensor in accordance with the invention for safeguarding a machine, in particular a robot arm, and for recognizing objects in a work zone of the machine has a control and evaluation unit that is configured to measure an actual measured value for a distance from the work zone or from an object arranged there and to recognize an object with reference to the actual measured value using a method in accordance with the invention in the distance measurement beam. It is in particular an optoelectronic distance sensor in accordance with the time of flight principle, wherein the distance sensor has a light transmitter for transmitting a light signal along a distance measurement beam and a light receiver for generating a received signal from the returning light signal and the control and evaluation unit determines the actual measured value from a time of flight between the transmission and reception of the light signal.

The control and evaluation unit is here preferably at least not exclusively integrated in the distance sensor itself, but is rather at least partly outsourced into a system connected thereto such as a safety controller or also an unsafe controller or another processing unit that is then safeguarded by redundancy or tests. The machine controller can also at least have parts of the control and evaluation unit. The implementation outside the distance sensor facilitates the updating and adaptation to other applications; in addition, the distance sensor can be kept simpler in this manner. A control and evaluation unit integrated in the distance sensor and an implementation distributed over the distance sensor and connected processing units are, however, also conceivable.

The distance sensor is preferably attached to the end effector of a robot and safeguards it by a protective jacket formed by a plurality of distance measurement beams (EOAS, end of arm safeguarding). The attachment to a different movable machine is likewise conceivable, for instance to an AGV (automated guided vehicle), and then in particular in an embodiment as a laser scanner that carries out a scan movement with the distance measurement beam. This scan movement can also only be emulated in a solid state Lidar. In a further possible embodiment as a 3D camera, in particular a TOF camera (time of flight, 3D camera with measurement of the time of flight in its pixels), every pixel spans a distance measurement beam, with pixels being able to be combined or selected to produce specific distance measurement beams.

The distance sensor is preferably a safe sensor and/or the functionality of the distance sensor is cyclically checked and/or the distance values of a plurality of distance sensors are compared with each other to produce safe distance values. Safe distance values are therefore acquired. The distance sensor can itself be formed in accordance with standards here. Safety can also be established by a plurality of redundant and/or diversely redundant distance sensors or cyclic functional tests or a higher safety level is reached in this manner. Terms such as safe or safety sensor in the sense of this description are always to be understood such that a safety standard for applications in safety engineering or for accident avoidance in the industrial area is satisfied, in particular for machine safety, electrosensitive protective equipment, industrial robots, collaborations with robots, or the like. They can be the standards named in the introduction or their successors, expanded versions, or respective corresponding versions in other regions of the world.

Figure 2:
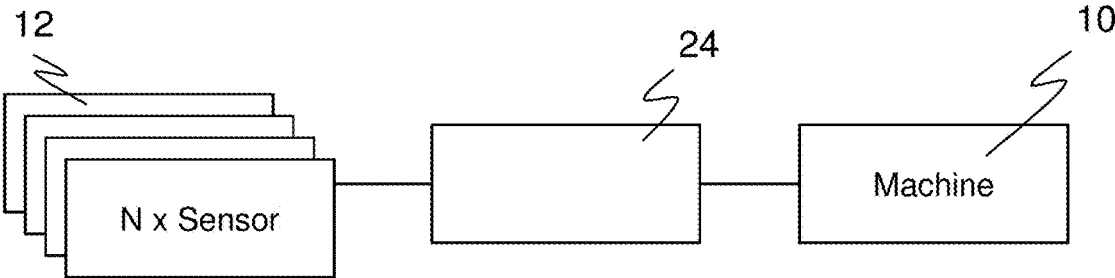
Figure 3:
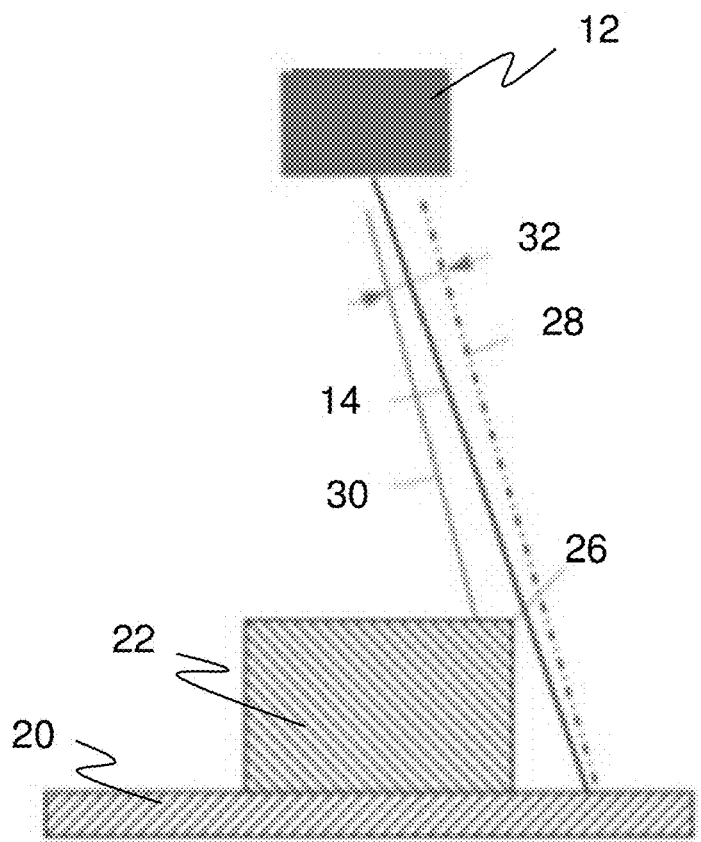
Figure 4:
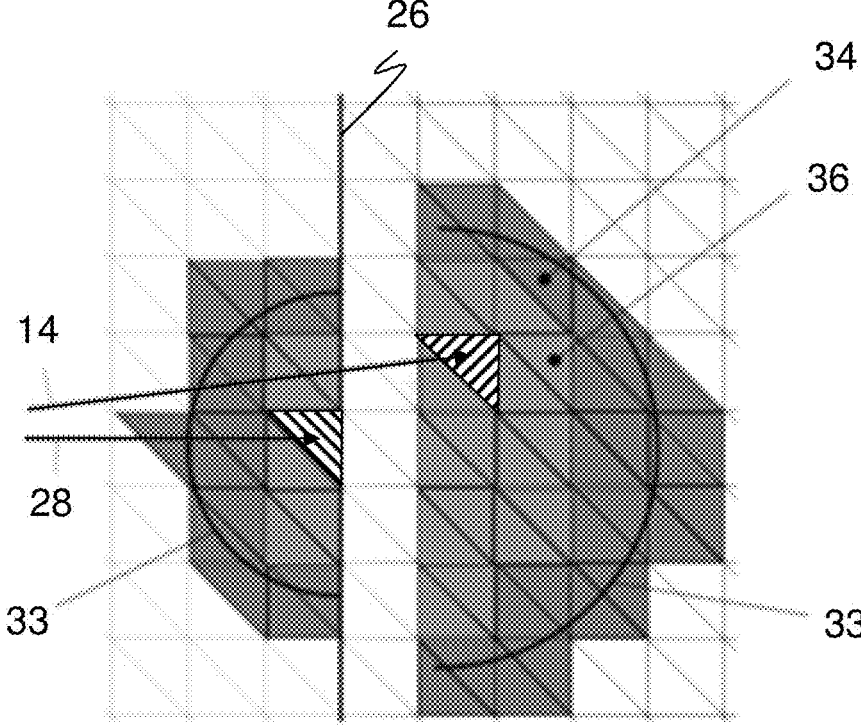
Figure 5:
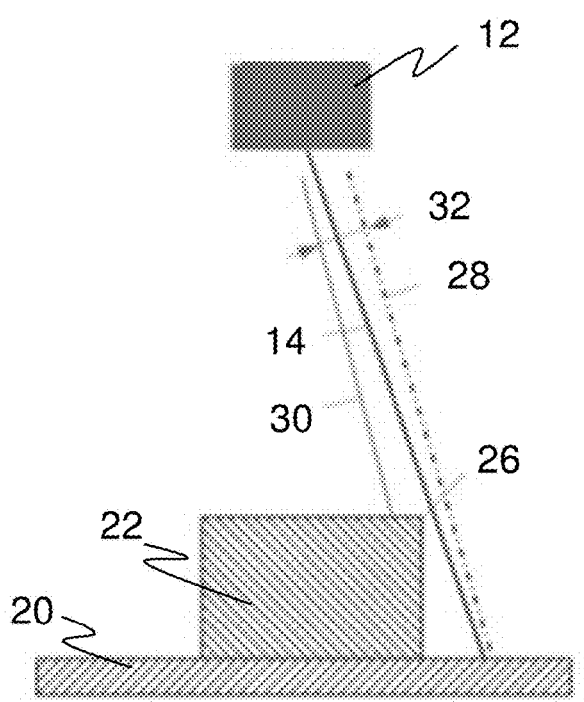
Figure 5:
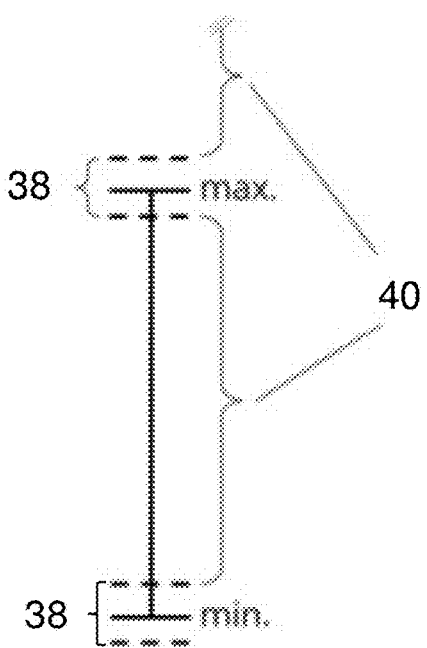
Figure 6:
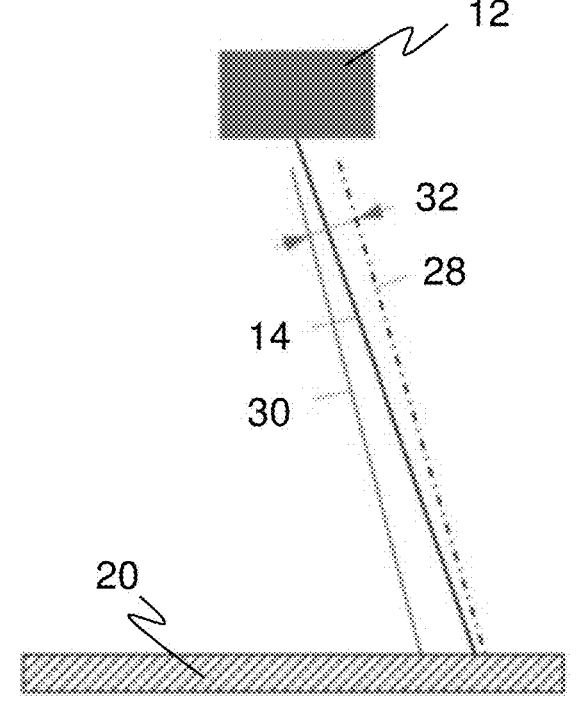
Figure 6:
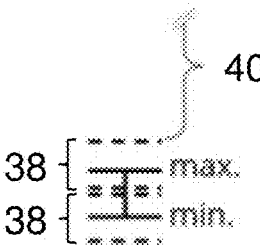
Figure 7:
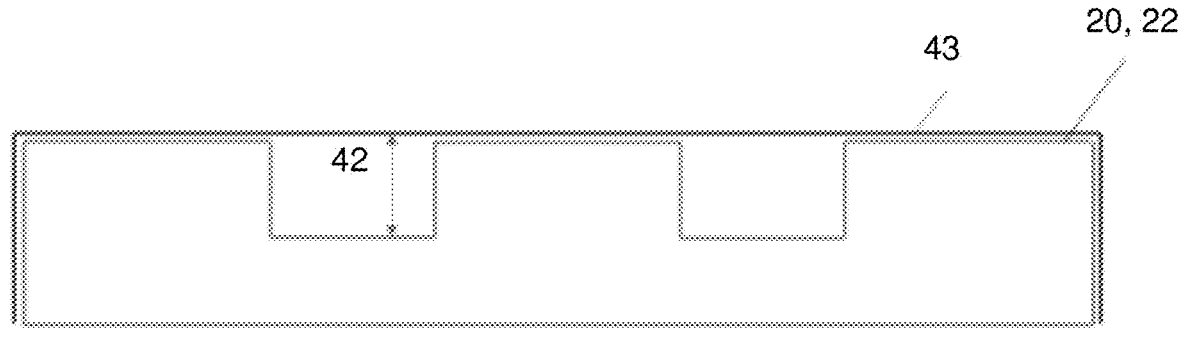
Figure 8:
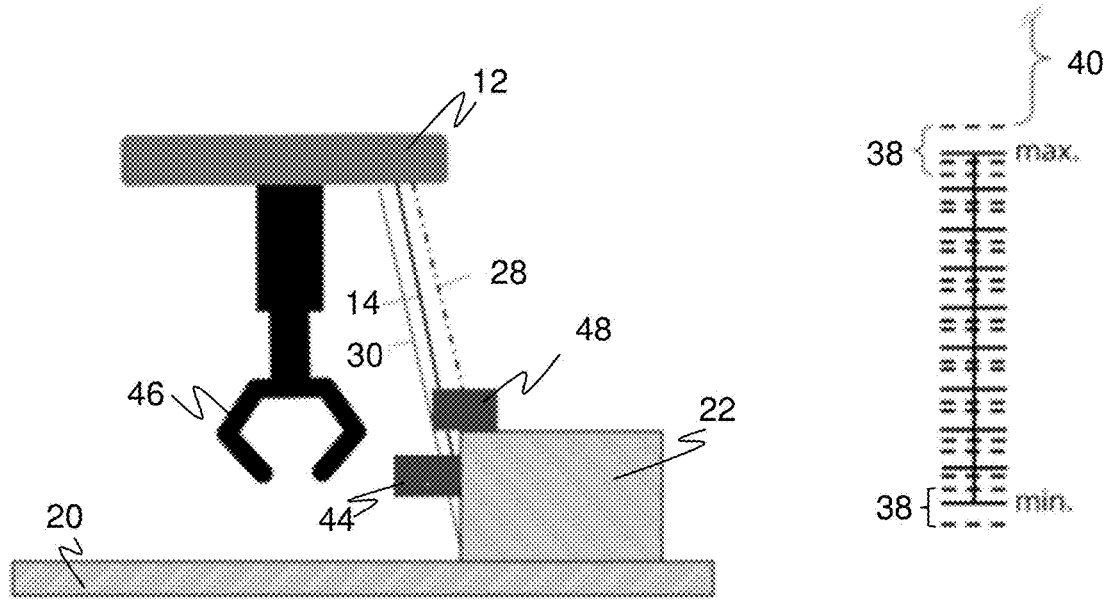

The invention will be explained in more detail in the following also with respect to further features and advantages by way of example with reference to embodiments and to the enclosed drawing. The Figures of the drawing show in:

FIG. 1 an overview representation of a machine to be safeguarded for the example of a robot arm with a distance sensor attached thereto that generates a virtual protective cover;

FIG. 2 a block diagram of a safeguarding system with at least one distance sensor;

FIG. 3 a schematic representation of a distance measurement beam and virtual distance measurement beams;

FIG. 4 a representation of a polygon mesh as a surface model of a work environment with an illustration of the sites of incidence of a distance measurement beam and virtual distance measurement beams;

FIG. 5 a schematic representation of a distance measurement beam and virtual distance measurement beams and the virtual measured value determined therewith on measurement at an edge;

FIG. 6 a representation in accordance with FIG. 5 now with a measurement on a planar surface;

FIG. 7 a schematic representation to illustrate a simplified surface model if actual measured values that are too large are tolerated; and FIG. 8 a schematic representation of a measurement situation in which an object is not recognized at a facing inclined surface to explain why this is not safety critical.

FIG. 1 shows an overview representation of a robot arm 10 to be safeguarded. The robot arm 10 and the specific application are examples and the subsequent explanations can be transferred to any desired robots and other moving machines and scenarios to be safeguarded, in particular AGVs/AGCs (automated guided vehicles/containers) or drones.

To specifically safeguard the end effector at its tip here, distance sensors 12*a-b* are attached to the robot arm, 10, preferably in the environment of a tool, for its safeguarding (EOAS, end of arm safeguarding). The distance sensors 12*a-b* determine distance values along a plurality of distance measurement beams 14. The shown number of two distance sensors 12*a-b* is purely by way of example; there can be more distance sensors or only one distance sensor that can then, preferably, measure along a plurality of distance measurement beams 14. Generally, one or more distance measurement beams 14 emanate from each distance sensor 12*a-b*. Distance measurement beams 14 can be approximately geometrical beams or can have a finite cross-section if, for example, the distance sensor 12*a-b* works as an area sensor having a fanned out light beam. Optoelectronic distance sensors, for example with a measurement of the time of flight (TOF) are particularly suitable as distance sensors 12*a-b*. DE 10 2015 112 656 A1 named in the introduction presents such a system to which reference is additionally made. There are, however, also other optoelectronic sensors to determine distances such as laser scanners and 2D or 3D camera and other equally completely different technologies, for instance ultrasound sensors, capacitive sensors, radar sensors, and the like.

The distance measurement beams 14 together form a kind of virtual protective jacket or a virtual protective cover 16 around the end effector. If the hand 18 of a person intrudes into the zone safeguarded by means of the protective cover 16, the protective cover 16 is considered as infringed. A safety related response of the robot 10 is therefore triggered that can comprise a slowing down, an evasion, or an emergency stop in dependence on the infringed distance thresholds.

The detection of the hand 18 in a distance measurement beam 14 takes place by means of an object recognition that will be explained more exactly further below with reference to FIGS. 3 to 8. In a brief summary, a surface model of the work surface 20 including objects 22 expected thereon is known. The surface model corresponds to the 3D contour or topography of the work surface 20 with the objects 22 expected thereon and is preferably already known beforehand. It is, for example, prepared manually in a CAD model or a surface model, for example of the robot cell, anyway present is imported. A contour measurement can furthermore be carried out, either with the distance sensor 12*a-b* itself or with a topography sensor such as a laser scanner or a 3D camera attached externally and/or to the robot for the teaching of the surface model. Alternatively or additionally to a preparation of the surface model in advance, the surface model can also be prepared as new or modified in ongoing operation or during an operational pause.

Which distance would have to be measured as long as no object and in particular no hand 18 is in the distance measurement beam 14 can be predicted from the pose of the distance sensor 12*a-b* with reference to the surface model. The pose is in turn calculated from the robot movements, with these so-called forward kinematics as a rule anyway being able to be determined and queried for the robot controller. The measuring behavior of the distance sensor 12*a-b* is thus simulated, a virtual measured value is produced that can be compared with the actual measured value of the distance sensor 12*a-b* to reveal whether there is anything different in the distance measurement beam 14 than in accordance with the surface model. It must be repeated that expected objects 22 are part of the surface model and are thus ignored by the object recognition. To make the comparison robust, not only the distance measurement beam 14 is simulated in accordance with the invention, but at least one additional virtual measured value from at least one further virtual distance measurement beam adjacent to the simulated distance measurement beam is rather determined and compared. This increases the robustness of the method, in particular with edge hits or in the vicinity of depth cracks in the 3D contour of the work surface 20 with expected objects 22 located therein or with the corresponding surface model.

As can be seen in FIG. 1, a limited length of the protective cover 16 is sufficient for the safeguarding. Measured values of the distance sensor 12*a-b* larger than this length can accordingly preferably be ignored in the object recognition since whether an object is at such remote distances or not is not safety related.

FIG. 2 shows a block diagram of a safeguarding system in accordance with the invention, with the robot arm now having been generalized, as already mentioned as a possibility, to be a machine 10. One or more distance sensors 12 are moved along with the machine part to be safeguarded, as shown in FIG. 1, to safeguard it from intrusions and so to avoid accidents and injuries. The distance sensors 12 are preferably optoelectronic sensors in accordance with the time of flight principle, but other similar sensors or sensors used as mixed from the above-listed examples are also conceivable.

The distance values are forwarded to a control and evaluation unit 24 where the object recognition still to be described is performed and from which a safe signal is output as required to the machine 10 or to its controller to trigger a safety response. The control and evaluation unit 24 can, as shown, be an external processing unit, alternatively an internal processing unit of the at least one distance sensor 12 or a combination of the two. Examples for an internal processing unit are digital processing modules such as a microprocessor or a CPU (central processing unit), an FPGA (field programmable gate array), a DSP (digital signal processor), an ASIC (application specific integrated circuit), an AI processor, an NPU (neural processing unit), a GPU (graphics processing unit) or the like. An external processing unit can be a computer of any desired kind, including notebooks, smartphones, tablets, a (safety) controller, equally a local network, an edge device, or a cloud. There is also a large selection with respect to the communication links, for instance I/O-Link, Bluetooth, wireless LAN, Wi-Fi, 3G/4G/5G, and in principle any industry suitable standard.

The distance sensors 12 and the control and evaluation unit 24 should preferably perform a safe detection and evaluation in the sense of the relevant standards. One way for this is that safe sensors and a safety controller are used.

It is, however, also conceivable to use originally unsafe hardware and to achieve the required safety level by redundancy, also diverse redundancy, or plausibility checks or cyclic tests. The object recognition now to be described makes its own contribution to the satisfying of safety demands.

FIG. 3 shows a schematic representation of a distance measurement beam 14 that extends close to an edge 26. The distance sensor 12 measures the distance from the site of incidence of the distance measurement beam 14 that is disposed, in dependence on the situation, on the work surface 20, on an object 22 expected there, or on an object to be recognized such as the hand 18. The measured distance is called the actual measured value as a delineation from the following simulations. It is assumed in the following that distance measurement beams 14 are looked at individually. The procedure is analogous when a plurality of distance measurement beams 14 are combined and, for example, their average is used as the associated actual measured value. Furthermore, no knowledge of the trajectory of the distance sensor 12 moved along with the machine 10 is required. Otherwise, a reference movement could simply be carried out in advance in which the expected measured values are taught for the situation without objects to be recognized together with errors that can be expected.

Since the current pose of the distance sensor 12 is thus unknown a priori, it is determined first. For this purpose, for example, use is made of the forward kinematics of a robot controller or comparable data of another machine controller. Any pose offset between the machine and the distance sensor 12 can be compensated by initial configuration or calibration. The assumed extent of the distance measurement beam 14 is now calculated from this pose. It is an assumed or simulated distance measurement beam as a virtual correspondence of the distance measurement beam 14 that is here called the first virtual distance measurement beam 28. A first virtual measured value for the distance is calculated using the first virtual distance measurement beam 28 by determining the site of incidence with reference to the surface model. A hand 18 in the distance measurement beam 14 would considerably cut the actual measured value so that a comparison between the actual measured value and the first virtual measured value recognizes an object in the distance measurement beam 14.

However, as also thus shown in FIG. 3, the distance measurement beam 14 and the first virtual distance measurement beam 28 do not exactly coincide due to irregularities, in particular in the pose determination and/or in the surface model. This may possibly result in substantial differences between the actual measured value and the first virtual measured value and thus in false positive object recognitions at the edge 26.

Provision is therefore made in accordance with the invention to produce at least one further virtual measured value in that at least one further virtual distance measurement beam 30 is provided to the first virtual distance measurement beam 28 as support and the distance from its site of incidence is calculated using the surface model. The further virtual distance measurement beam 30 has an offset 32 from the first virtual distance measurement beam 28 and preferably extends in parallel with it. No object has yet been deemed as recognized as long as the actual measured value is compatible with the virtual measured values, that is the first virtual measured value and the at least one further virtual measured value. A comparison of the actual measured value with the virtual measured values takes place for this purpose, for example, and no object is yet deemed as recognized as long as at least one of these comparison produces an agreement, preferably while permitting a tolerance. Both situations are thus covered that the distance measurement beam 14 is incident on the object 22 or the work surface 20 inside outside the edge 26. The limited offset 32 provides that the special situation of very different virtual measured values remains restricted to an environment of the edge. No object to be recognized with dimensions larger than the offset 32 can thus be overlooked.

Conceivable differences of the simulation are only taken into account in a single direction with only one further virtual distance measurement beam 30. A plurality of further virtual distance measurement beams 30 are therefore preferably formed which are dealt with in the very same corresponding manner. A further virtual distance measurement beam 30 is preferably provided in every direction so that the starting points of the further virtual distance measurement beams 30 are disposed on an at least topological, preferably also geometrical circular line. The difference between topological and geometrical means, as usual in mathematics, that deformations are permitted only in the first case, that is, for example, also an ellipse or a square is a topological circular line, for example. The case of a geometrical circular line will be explained more exactly in the following as representative without restricting the invention thereto.

FIG. 4 shows a representation of a polygon mesh as a preferred representation of the surface model. This representation is advantageous, but nevertheless purely by way of example. The polygons are particularly preferably triangles (triangle mesh). The representation is a plan view of an environment of the edge 26. There is a region to the right next to the edge 26 that is shaded by the object 22 of the surface model. No beams starting from the distance sensor 12 can be incident here purely geometrically.

Due to the addressed differences between the reality and the simulation, the distance measurement beam 14 and the first virtual distance measurement beam 28 hit different polygons, and indeed differing from the representation of FIG. 3, not at the one side and the other side of the edge 26. The further virtual distance measurement beams 30 describe in accordance with the assumed embodiment with starting points on a circular line on the polygon mesh circular curve segments 33 or, depending on the inclination of the polygons, somewhat more generally elliptical curve segments 33. Further virtual measured values are calculated for the polygons 34 swept over by the curve segments 33 and shown as dark in FIG. 4. In addition, further virtual measured values are also calculated for the inwardly disposed polygons 36 surrounded by the curve segments 33 shown as lighter. Ultimately, thinking in reverse, a respective further virtual distance measurement beam 30 is evaluated per polygon of the area surrounded by the curve segments 33. In this respect, the first virtual measured value of the first virtual distance measurement beam 28 coincides with one of the inwardly disposed polygons 36 in the example shown. This redundancy is harmless, but can also be intercepted in the implementation.

The virtual measured values can be stored in an array and can be updated cyclically, in particular with every measurement cycle of the distance sensor 12. In corresponding evaluation cycles of the object recognition, in turn preferably with each measurement cycle of the distance sensor, a comparison is made whether the actual measured value is compatible with the virtual measured values. As already explained, for this purpose, a comparison is in particular made whether there is at least one virtual measured value that is equal to the actual measured value except for tolerances. If this is the case, the actual measured value can thus be explained by the surface model and no object or no hand 18 is recognized. Otherwise, an object must be present and must have interrupted the distance measurement beam 14 since otherwise the actual measured value would not differ from all the virtual measured values by more than the tolerance.

So that the polygons 34 are contiguous under the curve segments 33, that is do not have any gaps, the further virtual distance measurement beams 30 are preferably correspondingly dense. This can be calibrated at an area at a maximum possible distance of the surface model. The arrangement discussed here by way of example with starting points of the further virtual distance measurement beam 30 on a circular line can be understood as a rotation of a further virtual distance measurement beam 30 on a circle having a radius o corresponding to the offset 32 and a certain angular increment w. The offset 32 and thus the radios o is preferably selected so that the distance measurement beam 14 is within the cylinder jacket, that the further virtual distance measurement beams 30 span, for all the expected errors in the pose of the distance sensor 12 or in the surface model. The angular increment w is furthermore preferably so small that the above density condition is satisfied, that is the polygons 34 are contiguous below the curve segments 33.

FIG. 5 again shows the schematic representation of FIG. 3 on the left side and illustrates the virtual measured values in the environment of the edge 26 on the right side. The spread between the minimal and maximum virtual measured values is large due to the edge 26. The intermediate values are not assumed by virtual measured values, the transition at the edge 26 is abrupt. An actual measured value that is compatible with the surface model, so that no object is therefore recognized, may only be in the tolerance ranges 38 around the virtual measured values. If an actual measured value is in the large remaining sensitive region 40, an object has been recognized.

FIG. 6 shows for comparison a representation in accordance with FIG. 5 now without an edge 26 on a measurement on a planar surface. The actual measured value is here only compatible with a very small range of distance values from the start since the minimal and maximum virtual measured values are very close to one another and as good as only one single tolerance range 38 is effectively produced. An object 40 is in turn recognized with an actual measured value in the remaining sensitive range 40.

FIG. 7 shows a schematic representation of a surface model, with here the contour of the work surface 20 and expected objects 22 located thereon being combined. In this example, there are smaller locally limited recesses 42 such as frequently occur on a work surface 20 of a robot, for instance with trays. In a preferred embodiment of the invention, work is performed with a simplified surface model 43 that ignores these recesses 42 and instead assumes continuous surfaces. The simplification has the result that the actual measured value is too large in the region of a recess 42. Accordingly, an object recognition is only triggered by too small an actual measured value, but not by too large a one. The actual measured value in particular has to be larger than all the virtual measured values for this special case. This is permitted from a technical safety aspect since it is still precluded that an object has approached the machine 10 in a hazardous manner.

FIG. 8 shows a schematic representation of a special measurement situation in which an exemplary object 44 to be detected per se by an object recognition has been overlooked, with this not being safety critical, however. This object 44 is arranged at a surface slanted toward the distance sensor 12. In somewhat more general terms, there is a depth crack at the object 22 of the surface model or at its edge, but the further virtual distance measurement beams 30 are also incident on the connection surface that is perpendicular here so that intermediate values are detected as virtual measured values. As illustrated in FIG. 8, the respective tolerance ranges 38 of the intermediate values complement one another to form so-to-say a continuum in an intermediate range between the minimal and the maximum virtual measured values. The sensitive range 40 of the object recognition is substantially reduced and excludes the intermediate range. An actual measured value for the object 44 is therefore compatible with the virtual measured values, the object recognition does not respond to the object 44. This is very different in the situation of FIG. 5 when this intermediate range is outside the tolerance ranges 38 and is a sensitive range 40.

Although the object recognition is accordingly incomplete, it has no significance for the safeguarding. It is namely physically impossible for the hand 18 to reach an object or anything else to be protected to the location of the object 44 without previously being noticed in the protective cover 16 that safeguards the hazard source shown by a gripper 46 in FIG. 8. Any other object 48 that could, for example attempt to reach the position of the object 44 is indeed in the sensitive range 40.

Alternatively to the described procedure, it is conceivable to establish a very precise coincidence between the distance measurement beam 14 and the first virtual distance measurement beam 28 and to generate a very exact surface model and likewise to calibrate it with respect to the distance sensor 12 and the real environment. This is, however, complex and also not necessarily stable in the long term so that false positive object recognitions nevertheless again arise after a certain operating period. A one-time or also a repeated calibration is nevertheless conceivable in a supplementary manner. The offset 32 or the above-introduced radius o can in particular remain small after a calibration and it can nevertheless be ensured that the distance measurement beam 14 extends within the further virtual distance measurement beams 30, whereby the effort for the evaluations is limited.

The invention claimed is:

1. A method of safeguarding a machine in which objects are recognized in a work zone of the machine, comprising:

moving at least one contactless distance sensor along with the machine, the at least one contactless distance sensor having at least one distance measurement beam which measures an actual measured value for a distance from the work zone or from an object arranged therein;

forming a first virtual distance measurement beam that simulates the at least one distance measurement beam, the first virtual distance measurement beam being formed from a pose of the at least one contactless distance sensor;

determining a site of incidence of the first virtual distance measurement beam on a surface model of the work zone;

calculating a first virtual measured value for the distance; and comparing the actual measured value for the distance with the first virtual measured value for the distance to decide whether the object is in the at least one distance measurement beam;

forming at least one further virtual distance measurement beam having an offset from the first virtual distance measurement beam;

determining a site of incidence of the at least one further virtual distance measurement beam on the surface model;

calculating at least one further virtual measured value for the distance;

comparing whether the actual measured value for the distance is compatible with the first virtual measured value for the distance and the at least one further virtual measured value for the distance; and recognizing an object in the distance measurement beam if the actual measured value for the distance is not compatible with the first virtual measured value for the distance and the at least one further virtual measured value for the distance.

2. The method in accordance with claim 1, wherein the machine is a robot arm.

3. The method in accordance with claim 1, wherein the step of comparing whether the actual measured value for the distance is compatible with the first virtual measured value for the distance and the at least one further virtual measured value for the distance comprises a comparison of whether the actual measured value for the distance is the same as at least one of the first virtual measured value for the distance and the at least one further virtual measured value for the distance except for a tolerance.

4. The method in accordance with claim 1, wherein a check is made for a recognized object whether a presence thereof is permitted and if not, the machine is switched to a risk-reducing or safe state.

5. The method in accordance with claim 1, wherein the surface model is configured or imported.

6. The method in accordance with claim 5, wherein the surface model is configured or imported as a CAD model.

7. The method in accordance with claim 1, wherein the surface model is measured by a sensor.

8. The method in accordance with claim 1, wherein the at least one further virtual measured value comprises a plurality of further virtual distance measurement beams, the plurality of further virtual distance measurement beams surrounding the first virtual distance measurement beam.

9. The method in accordance with claim 8, wherein starting points of the plurality of further virtual distance measurement beams at least topologically form a circular line.

10. The method in accordance with claim 1, wherein the surface model is a polygon mesh.

11. The method in accordance with claim 10, wherein the polygon mesh is a triangle mesh.

12. The method in accordance with claim 10, wherein the at least one further virtual distance measurement beam is incident on polygons of the polygon mesh that are adjacent to one another without gaps.

13. The method in accordance with claim 10, wherein the first virtual measured value and the at least one further virtual distance measured value for the distance are determined for polygons of the polygon mesh that are enclosed by other ones of the polygons of the polygon mesh on which the at least one further virtual distance measurement beam is incident.

14. The method in accordance with claim 1, wherein starting points of the at least one further virtual distance measurement beam form a grating.

15. The method in accordance with claim 1, wherein the at least one further virtual distance measurement beam extends in parallel with or at an acute angle to the first virtual distance measurement beam.

16. The method in accordance with claim 1, wherein the actual measured value for the distance and the first virtual measured value for the distance and the at least one further virtual measured value for the distance are determined and compared again cyclically.

17. The method in accordance with claim 1, wherein, when the actual measured value is larger than the first virtual measured value for the distance and the at least one further virtual measured value for the distance and is determined to not be compatible therewith, no object is recognized in the at least one distance measurement beam.

18. The method in accordance with claim 1, wherein the at least one distance measurement beam of the at least one contactless distance sensor comprises a plurality of distance measurement beams, wherein a respective actual measured value for the distance is determined for each of the distance measurement beams, each of the respective actual measured values for the distance being compared with the first virtual measured value for the distance and the at least one further virtual measured value for the distance.

19. The method in accordance with claim 1, wherein the at least one distance measurement beam forms a protective cover.

20. The method in accordance with claim 19, wherein no object is recognized in the at least one distance measurement beam when the actual measured value for the distance exceeds a length of the protective cover.

21. The method in accordance with claim 1, wherein the at least one distance measurement beam performs a scan movement.

22. A contactless distance sensor for safeguarding a machine, and for recognizing objects in a work zone of the machine, wherein the distance sensor has a control and evaluation unit that is configured to measure an actual measured value for a distance from the work zone or from an object arranged therein, and to recognize the object with reference to the actual measured value using the method in accordance with claim 1.

23. The contactless distance sensor in accordance with claim 22, wherein the contactless distance sensor is an optoelectronic distance sensor configured for determining the actual measured value for the distance based on the time of flight.

24. The contactless distance sensor in accordance with claim 22, wherein the machine is a robot arm.

25. The contactless distance sensor in accordance with claim 22, further comprising a light transmitter for transmitting a light signal along the at least one distance measurement beam, and a light receiver for generating a received signal from a returning light signal.

* * * * *